United States Patent [19]

MacKenna et al.

[11] Patent Number: 5,131,081
[45] Date of Patent: Jul. 14, 1992

[54] SYSTEM HAVING A HOST INDEPENDENT INPUT/OUTPUT PROCESSOR FOR CONTROLLING DATA TRANSFER BETWEEN A MEMORY AND A PLURALITY OF I/O CONTROLLERS

[75] Inventors: Craig A. MacKenna, Los Gatos; Cecil H. Kaplinsky, Palo Alto, both of Calif.

[73] Assignee: North American Philips Corp., Signetics Div., Sunnyvale, Calif.

[21] Appl. No.: 327,845

[22] Filed: Mar. 23, 1989

[51] Int. Cl.$^5$ .................. G06F 13/12; G06F 13/10
[52] U.S. Cl. .................. 395/275; 364/DIG. 2; 364/238.3; 364/240.5; 364/241.9; 364/242.92; 364/926.93; 364/927.98; 364/927.99
[58] Field of Search ... 364/200 MS File, 900 MS File

[56] References Cited

U.S. PATENT DOCUMENTS

| | | | |
|---|---|---|---|
| 4,103,328 | 7/1978 | Dalmasso | 395/275 |
| 4,246,637 | 1/1981 | Brown et al. | 364/200 |
| 4,268,906 | 5/1981 | Bourke et al. | 364/200 |
| 4,271,468 | 6/1981 | Christensen et al. | 364/200 |
| 4,296,466 | 10/1981 | Guyer et al. | 364/200 |
| 4,336,588 | 6/1982 | Vernon et al. | 395/325 |
| 4,514,823 | 4/1985 | Mendelson et al. | 364/900 |
| 4,587,609 | 5/1986 | Boudreau et al. | 364/200 |
| 4,591,973 | 5/1986 | Ferris, III et al. | 364/200 |
| 4,602,327 | 7/1986 | La Violette et al. | 364/200 |
| 4,682,304 | 7/1987 | Tierney | 364/900 |
| 4,688,166 | 8/1987 | Schneider | 364/200 |
| 4,901,232 | 2/1990 | Harrington et al. | 364/200 |
| 5,031,091 | 7/1991 | Wakatsuki et al. | 395/275 |

FOREIGN PATENT DOCUMENTS 0231595 12/1987 European Pat. Off. .
2085623 4/1982 United Kingdom .

OTHER PUBLICATIONS

"Advanced Peripherals For 16/32-Bit Microprocessors", Mini/Micro West Computer Conference and Exhibition, Nov. 8-11, 1983, San Francisco, Calif.
"MC6800"; Motorola Inc. 1984; pp. 1-31.

Primary Examiner—Thomas C. Lee
Assistant Examiner—Krisna Lim
Attorney, Agent, or Firm—Jack D. Slobod

[57] ABSTRACT

An input/output (I/O) processor and data processing system in which the processor receives and services interrupt request signals from I/O controllers, which requests may be internally or externally coded, and supervises blockwise transfer of data between an external memory associated with a main processing unit and the I/O controllers. The I/O processor includes an internal memory for storing information pertinent to data transfer from each I/O channel including the address where channel programs, decision tables and data buffers are maintained in external memory. A sequencer executes a specialized instruction set which includes instructions that invoke an interpretation means enabling examination of status registers of the I/O controllers and/or data values therefrom and the branching of execution based thereon. The I/O processor and I/O controllers may be interconnected with a local external memory via a local bus which is selectively coupled with a system bus interconnecting the main processor unit and main external memory.

42 Claims, 4 Drawing Sheets

SYSTEM HAVING A HOST INDEPENDENT INPUT/OUTPUT PROCESSOR FOR CONTROLLING DATA TRANSFER BETWEEN A MEMORY AND A PLURALITY OF I/O CONTROLLERS

BACKGROUND OF THE INVENTION

1. Field of the Invention

This invention relates generally to a processor for controlling a stream of input and/or output (I/O) data between a memory associated with a host computer (main processor) and one or more I/O controllers for peripheral devices in a manner offering some relief to the host computer of the burden of effectuating or supervising I/O. In its particular aspects the present invention relates to a programmable I/O processor interposed functionally among a main processor, a memory and a plurality of I/O controllers which I/O processor receives I/O service request signals from said controllers and handles the servicing thereof. The present invention also relates to a data processing system utilizing such I/O processor.

2. Description of the Prior Art

In the prior art, as represented by computer systems ranging from early mainframe computers to current microprocessor systems, each input or output device's controller logic typically presents an interrupt request signal to the main processor, to indicate events including the need to transfer data between memory and the device. In response to the assertion of this signal, the processor suspends the task in which it had been engaged, stores sufficient information in memory so that the task can be resumed in the future, and begins executing a subprogram which identifies the source of the interrupt request and then transfers any necessary data. When these things are accomplished, the main processor then fetches the previously stored information and resumes the task it had been performing.

This interrupt-driven means of accomplishing input/output has long been recognized to have a number of disadvantages. First, it may require numerous memory cycles to store the information about the main processor's former task and state (the exact number is dependent on the particular processor being used).

Second, in many systems a single interrupt request line, or a small number of such lines, carries all the event notifications from multiple I/O controllers and devices to the processor. Therefore the processor, by some combination of hardware and software means, must next identify which of the various devices has caused the interrupt, and if several devices are signalling an event, which of them should be processed first. When this is accomplished the processor begins executing a subprogram that is specific to the selected device, or a subprogram that is common to all devices of the same type as the selected device.

Third, the operation of most input and output devices can give rise to situations and events other than normal data transfer. For example, a tape drive can come to the end of its recordable medium, or a communications controller may detect a parity-check error in received data. Therefore, the subprogram must next check whether any such abnormal event has occurred before it can perform the data transfer. Typically this is done by reading a status register in the selected input/output controller, and interpreting the resulting value. Further, the interpretation of certain bits or flags within a status value many depend on the state of other bits/flags, and/or certain bits/flags may have "priority" over others as to the order in which they should be checked. Such characteristics lead to "tree structured" decision-making logic within the subprogram, wherein a series of successive examinations of the status is required. This further extends the execution time of the subprogram.

Only when the status has been examined and found to indicate a normal data-transfer request can the subprogram actually transfer the data between the controller and memory. At this point the subprogram may also send one or more commands to the controller to condition its future operation. For example, when the last of the data to be written in a record on a tape drive has been transferred, the drive may have to be commanded to stop tape motion. Also, at some point in this process and by some combination of hardware and software means, the controller must be conditioned to stop asserting its interrupt request signal for the current event, so that the processor will not be interrupted again for this same event.

Last, the processors must retrieve the information about its former activity, so that is can resume the activity, which may again require numerous memory accesses.

The main drawback of interrupt-driven input/output, then, is the time required to perform all of the functions described above, using a general-purpose instruction set like that found on common processors. Out of the total time the processor requires to perform these steps, only a small fraction is typically devoted to the actual data transfer between the controller and memory. If there are many input/output devices, and/or some or all of the devices have high data transfer rates, a large percentage of the main processor's time may be devoted to such I/O interrupts, to the detriment of system performance for computation and/or higher level aspects of system control. In worst-case situations with respect to the arrival of events, input data may even be lost, or output data may be distorted, because the processor can not respond to all the events in a timely manner.

The impact of interrupt-driven input/output on microprocessor operation can be illustrated utilizing a typical, but efficient, interrupt handling subprogram on a 68010 microprocessor (manufactured by Motorola and Signetics) to service interrupt requests from a Signetics 2698 Octal Universal Asynchronous Receiver/Transmitter (OCTART), an eight-channel full-duplex communications controller. The performance of the sub-program is enhanced by the fact that the 68010 needs only four memory transfers to save (restore) its prior task state. Second, it features vectored interrupts, which minimize the time needed to identify which device is interrupting. Third, its stored task state includes the vector number of the interrupting device, which eliminates the need for unique subprogram entry points for each OCTART, each of which would provide instructions to save registers and load a register with the identity (address) of the interrupting OCTART before proceeding to a common routine.

Despite these architectural advantages and despite being efficiently coded in 68010 machine/assembly language, it can be shown that handling one 2698 device that is operating full duplex at 9600 bits/second (a common communications rate) can require 70% of the processing capability of the 68010 just to receive and transmit characters, without processing them in any way.

This figure includes the further assumption that the processor is able to use its system bus at 100% utilization. Such a figure indicates to those skilled in the art, that if other devices share use of the system bus with the 68010, and/or if the same processor must also process the data being received and transmitted in any way, the 68010 is probably insufficient to the task of handling one such I/O controller A common solution to such performance problems, in applications like multi-user UNIX (a trademark of AT&T Bell Laboratories) systems, is to include multiple processors in the system. Typically each processor but one is dedicated to the task of handling the input-/output for whatever number of I/O devices its performance will allow (for the above example the number might be four communication lines). This solution increases system size and cost and drastically increases software (operating system) complexity.

For high-speed devices, problems with interrupt-driven input/output have led to the development of specialized hardware, ranging from "selector channels" on mainframe computers to "DMA controllers" in microprocessor systems, that can transfer data at high speed between a device controller and memory, independently of the main processor. Such facilities, in turn, have a number of limitations.

First, in general they are well-adapted to systems handling a small number of high-speed devices, but are not optimal for handling a large number of slower devices. Some devices of this type (selector channels) may restrict operation so that only one among the attached devices may operate at a time.

Second, such devices typically require their attached controllers to provide a specialized signaling interface that is different from that needed for interrupt-driven I/O. Compounding this problem, the various designers and manufacturers of such devices and controller devices have never standardized this interface. A difference in the interface between an I/O controller and a device of this type may require additional "glue" logic between the two, or may well make it impossible to interface a particular device of this type to a particular I/O controller.

Third, such devices typically have a very limited ability to handle events and conditions other than a straightforward data transfer request, and a very limited ability to track the context and status of attached controllers and respond differently based on said context.

On the other hand, as disclosed in U.S. Pat. No. 4,591,973, an I/O processor can be constructed using a general purpose microprocessor to control output data processing and distribution, input data collection and processing, Input/Output testing and system monitoring. By using a general purpose microprocessor, it is possible to program it to handle events dependent upon the status and context of the attached controllers. However, the time required for the execution of the necessary instructions, using such a general purpose microcomputer, severely limits the amount, or number of channels, of I/O that can be handled.

OBJECTS OF THE INVENTION

It is an object of the present invention to provide an intelligent I/O processor capable of controlling a stream of data between a memory and a plurality of I/O controllers, substantially independently of the main processor;

It is a further object of the invention to provide an I/O processor capable of handling a relatively large number of I/O controllers of a type which neither provide nor require any special interfacing signals or techniques beyond those common to interrupt-driven I/O;

It is yet another object of the present invention for said I/O processor to require a reduced number of memory transfers for the complete process of responding to a request from a controller, compared to a general purpose processor.

It is still a further object of the invention to provide an I/O processor which interacts with the host computer generally like a DMA controller but is able to handle a relatively large number of I/O controllers, devices and channels, each individually generally having a relatively lower data rate than ordinarily used with DMA controllers heretofore.

SUMMARY OF THE INVENTION

The aforementioned and other objects are satisfied, according to the principles of the invention, by an Input/Output Processor (IOP) that stands between a plurality of I/O controllers, a main processor and an external memory, and transfers data between the controllers and memory independently of the main processor. The I/O controllers need no special interfacing signals or techniques beyond those common to interrupt-driven I/O, in that the IOP has a plurality of inputs for receiving what would otherwise be interrupt request signals from the controllers.

The request signals from the I/O controllers are directed to request logic means within the I/O Processor of the invention. According to one option in the operation of the invention, the request logic means serves as prioritizing means for selecting one of among a plurality of possibly simultaneously asserted request signals, each from a different I/O controller, and for producing, internally to the IOP, a coded value corresponding to the highest priority request asserted, according to a defined priority order. In another option the request lines from each I/O controller are directed to encoding means external to the IOP which produces a similar coded value that is directed to the request logic means. The option selected for operation may be given by a bit within an internal control register of the IOP or may be given in the state of a control signal directed to the IOP.

The IOP, in addition to the request means includes a bus interface which provides a means whereby the I/O Processor can transfer information between the external memory and I/O controllers and which bus interface also includes arbitration means for controlling and coordinating use of the external bus(es) to which the bus interface is connected and further includes interrupt means for signalling the main processor of major events such as the completion of the process of transferring data between an I/O controller and a particular buffer in the system memory. An internal memory means is provided for storing, in various tables and registers, information related to the process of transferring data between the I/O controllers and system memory. The IOP also includes configuration means for enabling transfer of information from the main processor to the internal memory, and an execution means for performing a program which may be stored in internal or external memory. Corresponding to each request line from an I/O controller, a starting address within said program is stored in a table in the internal memory.

In response to the assertion of a request signal from an I/O controller which has been enabled and set into operation, the IOP reads from memory a subprogram consisting of instructions to the execution means, the format and capabilities of which are strictly customized to the task of handling input/output controllers, and which are therefore more efficient at the task than are the instructions of a general-purpose processor. Under control of this subprogram, the execution means handles the request by doing any or all of the following: reading status registers in a controller, interpreting each such status item according to one of a number of tables stored in memory, reading data from external memory or from the controller depending on the overall direction of the data flow, interpreting the data according to similar stored tables, writing the data to the controller or to memory, sending commands to the controller to condition its future operation, changing its own mode of response to future requests so as to track the status and context of the input/output process, changing the memory buffer area for future transfers among a plurality of such areas, and asserting its own interrupt request to the main processor upon the occurrence of a major event such as the completion of transfer of a memory buffer.

The IOP is intended to reduce the number of memory transfers needed for the complete process of responding to a request from a controller compared to a general purpose processor. For relatively smaller systems in the lower end of the range of system sizes to which the invention is applicable, this reduces the loading on the system bus that the IOP shares with the main processor, and thus improves system performance in terms of increased availability of the main processor for computation and higher levels of control. For larger systems involving a large number of I/O controllers, bus loading and processor availability are further improved because a local bus, separate from the system bus, couples the I/O controllers to the IOP and to a local external memory which is provided in addition to a main or system external memory that is coupled to the system bus. A set of hardware buffers forms the interface between the local and system busses.

One of the means, by which the number of memory cycles is minimized, is a decision table structure in which a subprogram can transfer control to any of a plurality of addresses within itself, one address for each possible value of a status byte, in a single operation. This is more efficient than the serial tree-structured decision-making that characterizes interrupt routines for a general-purpose processor.

The IOP is able to request and exercise, when the request is granted, temporary mastery or ownership of the system bus. In this respect it accesses the main memory in the same manner as a DMA controller. However, the IOP is able to handle a larger number of I/O controllers and devices, typically those having a lower data transfer rate, than is typical of applications in which DMA controllers are employed. Further, such an embodiment can better handle exceptional events and conditions, and can more flexibly track changes in the context and status of the I/O processes, than can existent DMA controllers.

Other objects, features and advantages of the invention will become apparent upon perusal of the following detailed description of the preferred embodiments when taken in conjunction with the appended drawing wherein:

DETAILED DESCRIPTION OF THE PREFERRED EMBODIMENT

The intelligent Input/Output Processor (IOP) of the present invention, is a specialized processor (preferably on a single chip) capable of transferring data between a relatively large number of I/O channels (e.g. thirty-two) and a system or subsystem memory which is also accessed by a host computer or microprocessor (MPU). It is best understood by a discussion divided in two main parts, the first directed to the logical, circuit and functional attributes of the IOP's structure and the second directed to the functional aspects of the instruction set.

LOGICAL, CIRCUIT AND FUNCTION ATTRIBUTES OF STRUCTURE

Figure 1:
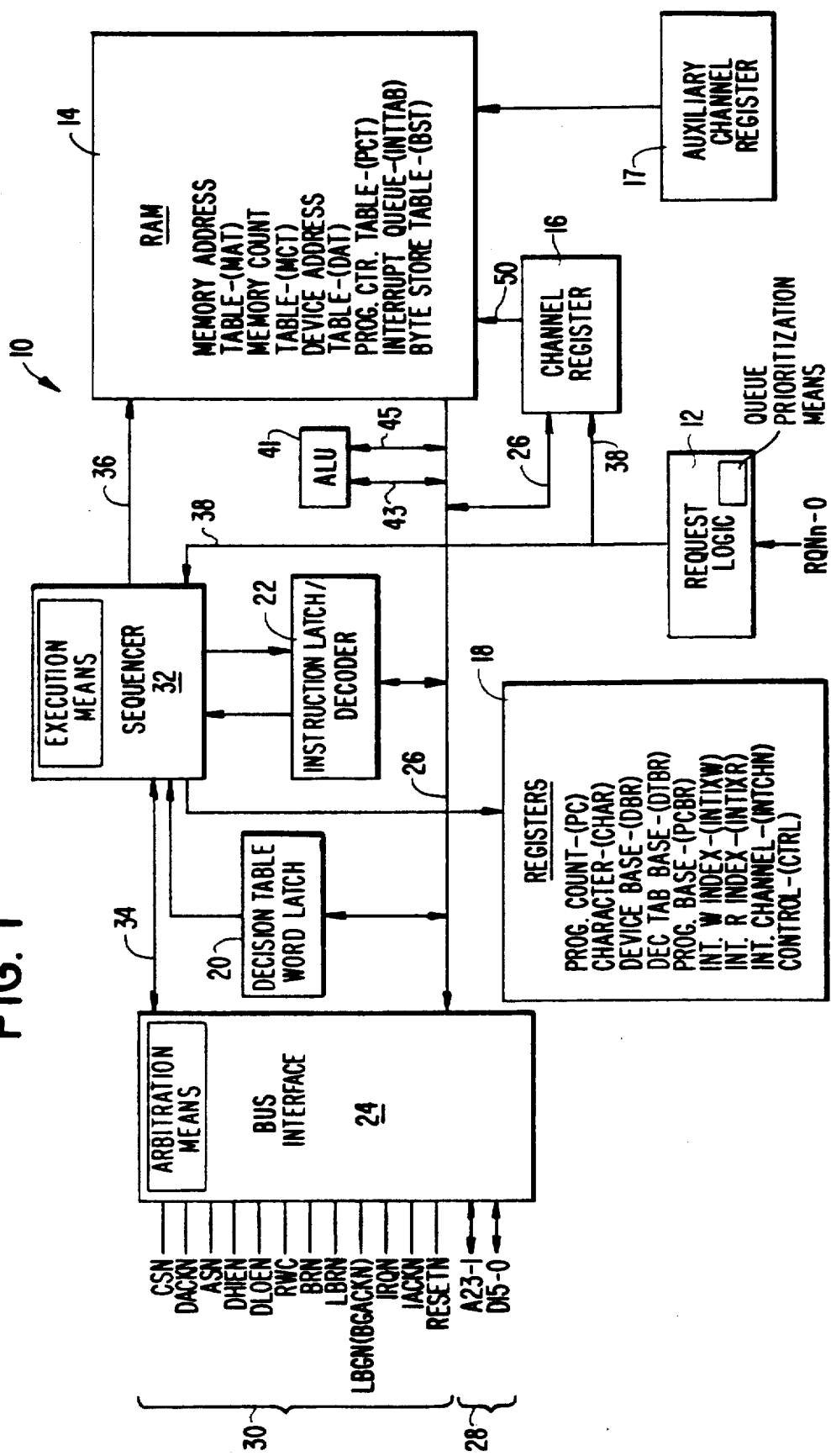
FIG. 1 is a block diagram of the intelligent Input-/Output Processor (IOP) of the present invention.

FIG. 1 shows the general internal structure of a preferred embodiment of the IOP of the present invention, designated as 10, which includes Request Logic 12 responsive to service request lines RQNn-0 for coupling to the various I/O controllers to be handled by the IOP, internal random access memory (RAM) 14, a channel register 16, an auxiliary channel register 17, a number of other internal registers 18, a decision table word latch 20, an instruction latch/decoder 22, and a bus interface 24 all coupled to an internal data bus 26. Bus interface 24 is for selectively connecting the IOP's internal data bus 26 to the address and/or data portions 28 of the external bus connections and provides and receives various bus arbitration, external interrupt and other control and configuration signals on connections 30. Bus interface 24 is controlled by sequencer 32 via lines 34. Sequencer 32 is a finite state machine including execution means for the specialized instruction set, that may be embodied by any of several techniques well known to those skilled in the art. In addition to providing control communication with bus interface 24, sequencer 32 selects a portion of internal memory 14 via lines 36, the balance of the internal memory address typically being provided by the channel register 16 via lines 50. Sequencer 32 receives inputs from request logic 12 on lines 38. It also can utilize certain signals respectively from decision table word latch 20 and instruction latch/decoder 22. Sequencer 32 also controls an Arithmetic and Logical Unit (ALU) 41 which is coupled to the internal bus 26. The interaction and function of these various internal blocks of IOP 10 and the function of sequencer 32 will become apparent as the discussion proceeds.

The service request lines, RQNn-0, are input to the internal request logic 12. Several different organizations are possible relative to said service request lines. In a preferred embodiment each service request line is connected to a different controller (as in FIG. 2). It should be appreciated that each I/O controller may include a plurality of separate input or output processes, termed "channels", such as, for example, sixteen such channels are provided by a Signetics 2698 Octal Universal Asynchronous Receiver/Transmitter (OCTART). In the event of such direct connection of request lines from controllers, the request logic 12 determines the highest priority among possibly simultaneously asserted requests according to a defined priority among the 'RQ' lines. Thereafter, by means which will be described later, the IOP 10 typically determines which channel of a multi-channel I/O controller is to be serviced. In cases where the number of controllers to be serviced exceeds the number of service request lines RQNn-0, the signals or lines RQNn-0 can represent a code corresponding to which controller is asserting a service request, encoded prior to said input by external logic (as will be apparent from FIG. 3). In either the internally or externally encoded case, all of the input signals on lines RQNn-0 being in their inactive state indicates "no request".

As stated, the capacity of IOP 10 is characterized by the number of "channels" it can handle. A full duplex communication line requires two channels. Furthermore, if system needs require IOP 10 to be able to switch among various buffer memory areas for an input or output process, then an additional channel is required for that process.

As shown in FIG. 1, IOP 10 includes a quantity of internal random access memory (RAM) 14, of sufficient size to store:

1) a Memory Address Table (MAT) giving, for each channel, the current memory address to or from which data is to be transferred;

2) a Memory Count Table (MCT) giving, for each channel, the current count of locations remaining in the current memory buffer;

3) A Device Address Table (DAT) giving, for each channel, a base address within the I/O controller from which status is to be read, and from or to which data is to be transferred;

4) a Program Counter Table (PCT) giving, for each channel, the memory address from which the first instruction is to be fetched in response to the device's request, expressed as an offset to the Program Base Register (PCBR) within registers 18. Because the number of channels exceeds the number of requests, a programmatic means to use a channel's PCT entry is also provided.

5) An Interrupt Queue (INTTAB) of sufficient size to store multiple entries, each entry including the information needed to identify an interrupt to the host MPU. Such information typically comprises a channel number and interrupt vector code. The required number of such entries is equal to the maximum number of interrupt requests to the main processor that can be pending at one time, for all the channels; in general this is at least one per channel. The Interrupt Queue is preferably divided into two sections (not shown) corresponding to two levels of interrupt priority; and 6) A Partial Data Table providing data for each channel to facilitate transfers with devices having a different number of bits of bus width than the data bus (part of 28). The Partial Data Table comprises N−1 bytes of data and N−1 corresponding "presence bits" for each channel, N being the width of the embodiment's data bus in bytes, plus $\log_2 N$ "Device Data Width" bits for each channel specifying the transfer width of the channel's I/O controller, plus one "Memory Xfer Width" bit for each channel specifying whether data transfers with external memory should be at width N or at the I/O controller's width.

In the illustrative embodiment the Device Data Width and Memory Xfer Width bits are actually read and written together with the MCT data. In this initial embodiment, N=2 so that the Partial Data Table stores one byte of data for each channel and is called a Byte Store Table (BST).

IOP 10 also includes a channel register 16, containing the number of the current channel when the IOP is operating in response to a request signal from an I/O controller. When service is started for a channel, register 16 is loaded via lines 38 from the output of request logic 12, and the contents of said register serve as an index into internal memory, particularly into the Program Count Table (PCT), the selected entry specifying the starting point for execution. Said channel register contents can also be modified via internal bus 26, as a result of the Interpret Instruction to be discussed later. Channel Register 16 also serves as an index to the Memory Address Table (MAT), Memory Count Table (MCT), Device Address Table (DAT) and Byte Store Table (BST) which are contained in internal memory 14. Furthermore, an Auxiliary Channel Register 17 is provided as a further index for use in connection with certain instructions.

IOP 10 also has a plurality of other registers 18 whose purpose and function is as follows:

1) A Program Count Register (PC) points to the current instruction being executed by sequencer 32 (if any) within a program.

2) A Character Register (CHAR) is a temporary store for characters in transit between a device and memory. Data between I/O controllers and memory flows therethrough and status from an I/O controller is read thereinto.

3) A Device Base Register (DBR) provides more significant address bits to be concatenated with less-significant address bits from the Device Address Table, to form the address(es) of the I/O controller(s). This allows the size (width) of the DAT to be minimized for an economic advantage.

4) A Decision Table Base Register (DTBR) provides the more significant address bits for Decision Tables residing off chip in system or other external memory.

5) A Program Base Register (PCBR) provides the more significant address bits to be concatenated with less-significant address bits from the Program Counter (PC), to form the address in memory from which instructions are fetched.

6) INT W Index (INTXW) and INT R Index (INTXR) Registers comprise, respectively, counters used for writing into the Interrupt Queue (INTTAB) when a channel program indicates that an interrupt is to be requested, and for reading from INTTAB when the host MPU acknowledges an interrupt. These registers contain, respectively, the addresses in INTTAB, at which interrupt information is next to be stored and from which a channel number and main processor interrupt vector code is next to be read.

If two levels of interrupt priority are provided then each level has its own (INT) W counter and (INT) R counter. If true (dynamic shifting) First-In First-Out (FIFO) memories are used to implement the Interrupt Queue, then neither INTW nor INTR registers are needed.

7) An Interrupt Channel Register (INTCHN), accessible to the host MPU, from which the number of the current (most recent) interrupting channel can be read; and 8) A Control Register (CTRL) which can be set by the host MPU to control the basic operation and configuration of IOP 10.

Turning now from those registers which are evident in a software view to those which are needed for short term storage by the hardware implementation, the Instruction Latch/Decoder 22 captures data from the internal bus 26 on command from sequencer 32 when an instruction is being read from memory. After capturing an instruction word, this block decodes the word and presents to the sequencer 32 a set of signals that are sufficient to define which of the various instruction types the word represents. In response to control signals from sequencer 32, the Instruction Latch/Decoder 22 may place various subfields within the instruction word onto selected signals within the internal bus 26.

Similarly, the Decision Table Word Latch 20 captures the data from internal bus 26 on command from sequencer 32 when a decision table word is being read from memory. After capturing the word, latch 20 presents part of its contents to the sequencer 32; on command from sequencer 32, it may place other subfields of the word on selected signals within bus 26.

It should be appreciated that issues of realizability, speed and cost, with respect to the capacity of internal memory 14 may be resolved by sizing it sufficient to contain the various tables described heretofore, but not the channel programs and decision tables which are advantageously maintained in system or other external memory. However, if sufficient internal memory 14 is provided for IOP 10 to also contain said channel programs and/or decision tables, the Program Base Register (PBR) and Decision Table Base Register (DTBR) are not required, and operation of the IOP 10 is enhanced by the elimination of instruction- and decision-table-fetching cycles (traffic) from the external bus 28. It should be further appreciated that IOP 10 may also or alternatively be combined, within the same integrated circuit and package, with one or more I/O controllers, providing an operating enhancement by the elimination from the external bus 28 of status reading, data transfer, and other bus cycles between the IOP 10 and those I/O controllers. In fact, the initial embodiment actually includes four such Universal Asynchronous Receiver/-Transmitters (UARTs) (not shown), but they are not mentioned elsewhere herein, for ease of understanding. The IOP 10, as it interacts with a system, will be better understood with the following listing, in tabular form, of the name and function of its various inputs and output signals. (Lines such as supply voltages and clock are omitted for ease of understanding).

| MNEMONIC | NAME AND FUNCTION |
|---|---|
| RQNn-0 | Request Lines: A set of inputs from external peripherals handled by the IOP. Typically these will be "interrupt request" lines in the terminology of the peripherals. |
| CSN | Chip Select: An input indicating the host MPU is trying to access a register on the IOP. Typically this signal comes from decoder logic on the address bus. |
| A23-1 | Address Lines: When the IOP is acting as a bus master, these lines carry the word address to be accessed, which may be in memory or in a peripheral device. When the IOP is a bus slave, low-order bits among these lines select an internal location in the IOP to be read. |
| D15-0 | 16 Bit Bidirectional Data Bus: The data bus among the IOP, memory, peripherals, and the host MPU. |

| MNEMONIC | NAME AND FUNCTION |
|---|---|
| DACKN | Data Acknowledge: When the IOP is acting as a bus master, this line is an input signal from memory and peripherals, acknowledging that the requested bus transfer has been completed. When the IOP is acting as a bus slave, this is an output to the host MPU, with the same meaning. |
| ASN | Address Strobe: When the IOP is acting as a bus master, this is an output indicating that a transfer cycle is in progress on the bus, and in particular that a valid address has been placed on A23-1. |
| DHIEN, DLOEN | Data High, Low Enable: When the IOP is acting as a bus master, DHIEN, indicates in a read cycle that the memory or peripheral selected by A23-1 should read a byte and place its contents on D15-D8, while DLOEN has the same meaning for the D7-D0 lines. In a write cycle, DHIEN (DLOEN) indicates that the IOP has placed valid data on D15-D8 (D7-D0), and that the memory or peripheral selected by A23-1 should write the data into the appropriate byte(s). When both these signals are active, a 16 bit word should be transferred. When the IOP is not a bus master, these lines are inputs from the host MPU, with the same meaning. |
| RWC | Read/Write Control: When the IOP is a bus master, this is an output controlling the direction of data transfer on D15-D0. When the IOP is not the current bus master, it is an input from the host MPU, with the same meaning. |
| BRN | Bus Request: An output to the host MPU or other arbiter, requesting use of the MPU's bus. |
| BGN | Bus Grant: An input from the host MPU or other arbiter, granting use of the MPU's bus to the IDSP. |
| LBRN | Local Bus Request: An input used in systems in which the MPU and IOP have separate busses whereby the MPU can request access to resources on the IOP's bus, including registers and memory within the IOP itself. |
| LBGN (BGACKN) | Local Bus Grant (or BGACKN Bus Grant Acknowledge): An output by means of which the IOP responds to LBRN, and grants the MPU access to resources on the IOP's bus. For applications in which the IOP and MPU share a common bus, the IOP can be programmed to use this output as BGACKN. |
| IRQN | Interrupt Request: An output to the host MPU, indicating that at least one channel program has requested an interrupt that has not yet been acknowledged. |
| IAKN | Interrupt Acknowledge: An input indicating that the host MPU is acknowledging the interrupt requested by IRQN. The IOP responds to the assertion of this signal by placing an interrupt vector on D7-D0, and, if there are no further interrupt requests that have not been acknowledged, by releasing IRON. |
| RESETN | Master Reset: Reset for the IOP logic. |

Figure 2:
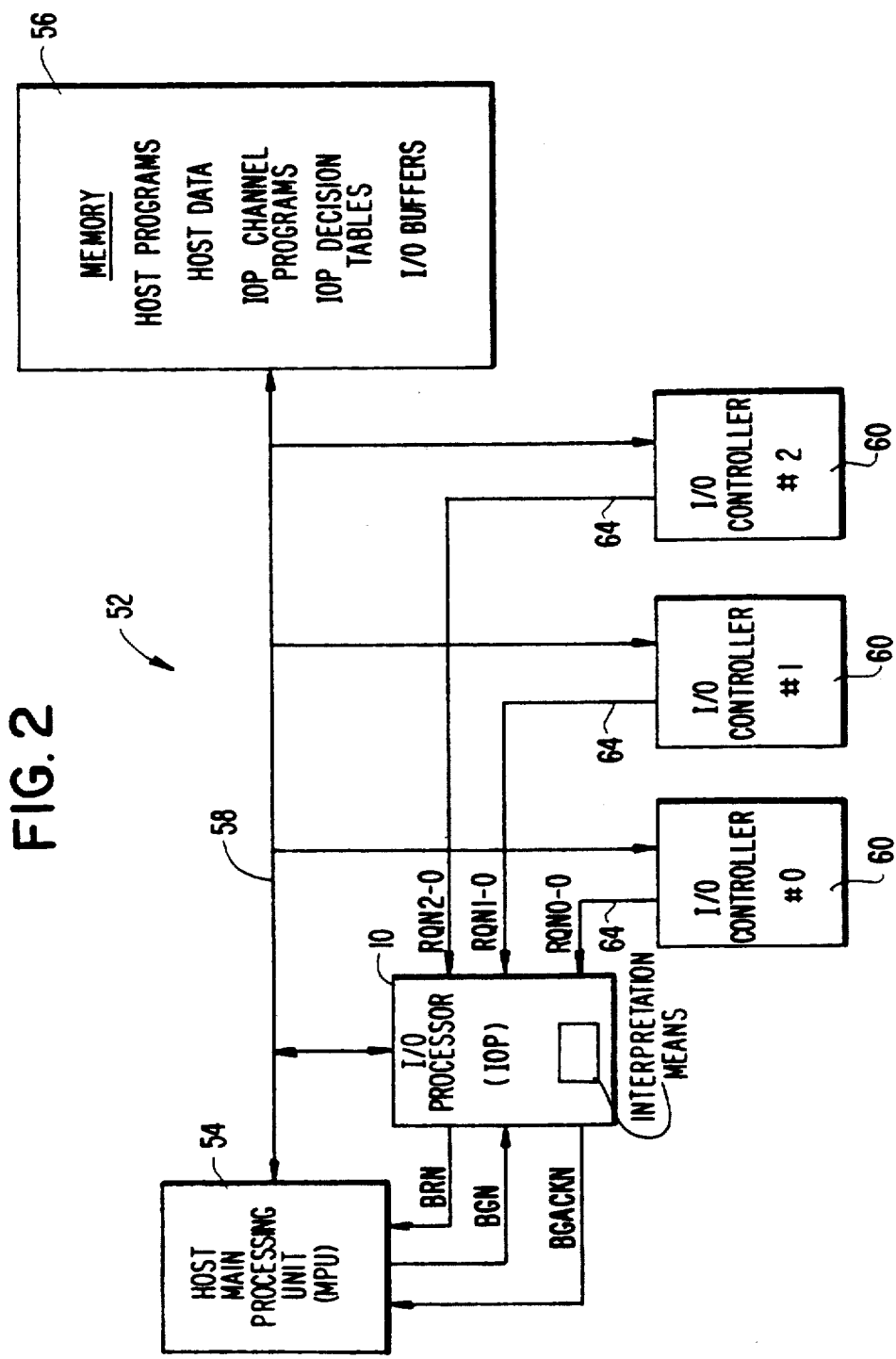
FIG. 2 is a block diagram of a relative small system using the IOP of the present invention.

FIG. 2, which illustrates a relatively small or simple system 52 using IOP 10 should now be understandable. System 52 is comprised of a host computer or microprocessor (MPU) 54 and a main or system memory 56 interconnected by system address and data buses 58. IOP 10 is also coupled to the address and data busses 58 as are a plurality of I/O controllers 60 (less than or equal in number to the number of request lines RQNn-0 provided in IOP 10, three being illustrated as an example).

Memory 56 contains programs and data for the host MPU 54, channel programs and decision tables for the IOP 10 and also includes a plurality of I/O buffer areas to which MPU 54 writes output and from which the MPU reads input. Each I/O controller 60, controls one or more I/O devices or channels (not shown) such as disk drives, tape drives, printers and serial communication links which need only be suitable for interrupt-driven I/O, as opposed to having special features for use with a DMA Controller.

An individual interrupt service request output line from each I/O controller is fed to the individual request inputs of IOP 10 such as RQN0-0, RQN1-0 and RQN2-0 for prioritizing, by Request Logic 12 within IOP 10. This connection method may be employed as long as the number of such request lines from the I/O controllers 60 does not exceed the number of request inputs provided by IOP 10. The Request Logic 12 produces a numeric code corresponding to the highest priority asserted line among RQNn-0; this code is loaded into the channel register 16 and Auxiliary Channel register 17 when the IOP 10 begins execution for said request.

IOP 10 is configured to request, or offer for arbitration such request, that IOP 10 have temporary mastery or ownership of the system bus 58. This is accomplished by asserting the BRN output from IOP 10 to host MPU 54 (or other arbiter). When the BGN signal is asserted by the host MPU (or other arbiter) to IOP 10, this assertion constitutes a grant to IOP 10 of such use. The optional BGACKN output may be asserted by IOP 10 to the MPU for the purpose of indicating acknowledgement of receipt by IOP 10 of the bus grant.

Figure 3:
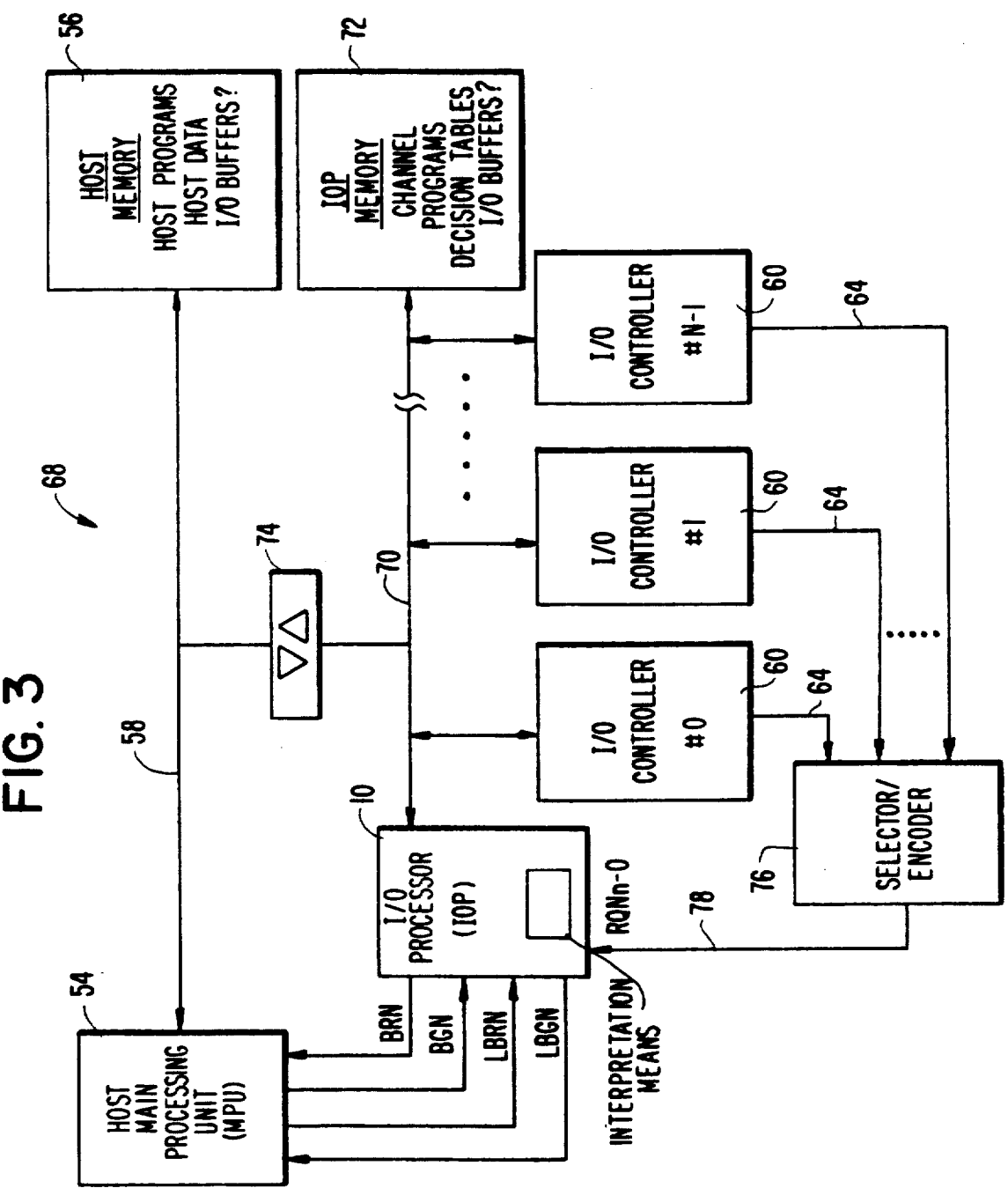
FIG. 3 is a block diagram of a relatively larger system using the IOP of the present invention.

The system 68 of FIG. 3 is suitable for a more complicated and/or higher performance system servicing a relatively larger number of I/O controllers (such as up to thirty-two channels), or else a similar number of I/O controllers each having a higher data transfer rate. Therein, the host MPU 54 and system memory 56 are interconnected by the system bus 58 while a local address and data bus 70 is provided interconnecting the IOP 10 and a local external memory 72. The various I/O controllers 60 can be advantageously connected to the local bus 70, although some or all of them may be instead connected to the system bus 58. The system bus 58 and local bus 70 are coupled via a hardware buffer interface 74 wherein any flow therethrough and the direction thereof is controlled by the one of host MPU 54 or the IOP 10 which has temporary control or mastery of the other's bus. Temporary mastery by IOP 10 of system bus 58 is accomplished by the BRN output from the IOP 10 to host MPU 54 requesting mastery and the output BGN from host MPU 54 for granting such mastery, while temporary mastery by MPU 54 of local bus 70 is accomplished by the LBRN output from host MPU 10 to IOP 10 requesting mastery and the output LBGN from IOP 10 to host MPU 54 granting such mastery.

For providing IOP 10, at its request inputs RQNn-0, with a code indicative of which I/O controller 60 requires service, a service request interrupt line 64 from each controller 60 is input to external encoder 76 having output lines 78 feeding said request inputs. In the event of simultaneous requests, encoder 76 chooses one request according to some deterministic method, the simplest such method being a predetermined priority among the controllers. Such external encoding must be employed in systems in which the number of request lines from the I/O controllers 60 exceeds the number of request inputs of the IOP 10. It may also be employed in systems in which the strict priority selection provided internally by the IOP 10 is not appropriate, for example, systems in which a "fair" or rotating selection method is desired. It is recognized that I/O controllers are becoming more intelligent themselves and some have or soon will have the ability to provide interrupt or other outputs indicative of which channel requires service or of the priority thereof. In such cases such outputs may be utilized by external encoder 76 to provide a more informed prioritization. Regardless of the method of selection, encoder 76 provides a numeric code corresponding to the selection, on its output lines 78, and said code is loaded into channel register 16 and auxiliary channel register 17, when the IOP 10 begins execution for said request.

In such system 68, the host memory 56 contains the various programs and data for the host MPU 54 and may also contain the I/O buffer areas for the host MPU to read from and write to. Optionally some or all of the I/O buffer areas may be located in the local external memory 72. Channel programs and decision tables reside in this local memory 72, which reduces the loading (traffic) on system bus 58.

The ability of IOP 10 to efficiently handle a large number of I/O controllers 60, which need only be suitable for interrupt-driven I/O, is due in large part to the specialized and efficient instruction set, hereafter described.

FUNCTIONAL DESCRIPTION OF THE INSTRUCTION SET

While a given embodiment may include additional instructions to enhance the processing capability of the IOP in various ways, the following minimal set of instructions is needed for proper operation of the subject invention. The description of each instruction type includes first a general description of its operation and second a description of the subfields of the instruction word. It is implicit that each instruction word must contain an operation code subfield that is decoded by the Instruction Latch/Decoder 22 to differentiate among the various instruction types.

The third part of the description of each instruction type describes the steps that Sequencer 32 performs in executing an instruction of the type. An implicit prelude to these steps, for every instruction type, is that the Sequencer 32 has read the instruction word from memory at the address indicated by the contents of the Program Count (PC) register, latched the word into the Instruction Latch/Decoder 22, and has thereafter incremented the content of the Program Count register (PC) so that it indicates the next higher address. If the word is read from external memory 56 or 72, the Sequencer 32 signals the Bus Interface 24 that a word is to be read from memory, providing the address formed by concatenating the contents of the Program Base Register (PCBR) as the more-significant bits and the contents of the Program Counter register as the less-significant bits, and then waits for the Bus Interface 24 to signal that the word has been accessed.

INTERPRET INSTRUCTION

This instruction typically reads a status register in an input/output controller 60 and uses its value as an index into a "Decision Table" in internal or external memory, retrieves the corresponding value from the table, and based on that value may change the contents of the channel register and/or reload the Program Count register (PC) to begin executing a different portion of the channel program. The instruction includes a Device Offset subfield that specifies the displacement of the desired status register from the address given by the Device Address Table (DAT) entry for the current channel. The instruction also includes a Decision Table Number subfield that specifies which table, among the number of decision tables supported by the embodiment, is to be used for the instruction.

After fetching the instruction word indicating an INTERPRET instruction, the IOP 10 first tests the word to determine whether the Character register (CHAR) should be loaded from a status register in the I/O controller 60, or whether the prior contents of the Character register should be used. In the initial embodiment, an "all-ones" value in the Device Offset subfield indicates "use the prior contents of the Character register". If loading is not specified, the IOP 10 omits the operations described in the remainder of this paragraph; this feature allows various flexibilities such as the ability to re-interpret a status register value in another way without having to re-read the register. If loading is specified, the Sequencer 32 signals the Bus Interface 24 that a byte is to be read from an I/O controller 60, and commands the ALU 41 to provide the address as the sum or exclusive OR of the Device Offset subfield and the Device Address Table (DAT) entry for the current channel. When the Bus Interface 24 signals that the information has been read from the I/O controller and is available on the Internal Data Bus 26, the Sequencer 32 latches the information into the Character register.

Next the Sequencer 32 initiates a read operation from a decision table, which may reside in internal or external memory. For internal memory, the address to be read is the concatenation of the Decision Table number subfield of the instruction word as the more significant bits, and the contents of the Character register as the less significant bits. The Sequencer 32 simply provides this address to internal memory 14 along with an indication that a decision table is to be read; the memory then places the contents of the indicated word on the Internal Data bus 26. For external memory, the Sequencer 32 signals Bus Interface 24 that a memory word is to be read, and provides it with the address that is the concatenation of the contents of the Decision Table Base register (DTBR) as the most significant bits, the contents of the Decision Table number subfield of the instruction word as the middle bits, and the contents of the Character register as the least significant bits, and then waits for the Bus Interface 24 to signal that the data has been read and is available on the Internal Data Bus 26. Regardless of the type of memory accessed, the Sequencer 32 latches the information into the Decision Table Word Latch 20.

Decision table words used for an INTERPRET instruction contain two or three subfields: first a value to be added to the contents of the Channel Register 16 so that a different channel can be used for subsequent instructions, second a value that can be loaded into the Program Counter Register (PC) so that a different instruction sequence can be performed, third an indication of whether said value should indeed be loaded into the Program Counter (PC). The third indication may constitute a separate one-bit subfield of the decision table word or it may be implicit in a special value of the second subfield (e.g., the value zero might indicate that the Program Counter Register is not to be reloaded). A (different) special value of the second subfield indicates that the PCT entry for the (possibly updated) current channel should be loaded into the Program Counter. This last facility allows separate states/contexts to be maintained for each channel within a multi-channel I/O controller.

The user of the IOP 10 encodes the contents of the various words in the Decision Table in memory, to indicate the actions to be performed for each possible value that may be read from the I/O controller's status register. Each such word can indicate a change to the Channel register (CHAN), a change to the Program Counter (PC), neither, or both. ("No change" to the Channel register is accomplished by simply providing zero in the first subfield).

After latching the Decision Table word in latch 20, the Sequencer 32 causes the contents of the Channel register (CHAN) and the contents of the first subfield to be added by ALU 41, and then latches the sum back into the Channel register 16. It then tests the Decision Table word to see if the Program Counter (PC) is to be reloaded, and if so it places the contents of the second subfield on the Internal Data Bus 26 and latches said contents into the Program Counter (PC).

This completes the operation of the INTERPRET instruction. After this instruction, the Sequencer 32 always continues operation of the current channel, by fetching and executing the instruction word indicated by the (possibly reloaded) Program Counter (PC).

INPUT INSTRUCTION

This instruction typically reads data from an I/O controller 60, optionally interprets it similarly to the INTERPRET instruction (thus possibly changing the contents of the Program Counter) and then writes the data to the channel's current buffer area in external memory (56 or 72). The instruction includes at least three subfields, first a Device Offset for selecting a data register to be read, and second a Decision Table Number as described for the INTERPRET instruction, and third a single-bit "End" subfield that indicates whether execution should always continue for this channel after the INPUT instruction is completed.

After fetching an instruction word indicating an INPUT instruction, the IOP 10 first tests the word to determine whether the Character register (CHAR) should be loaded from the I/O controller 60, as described in the INTERPRET instruction. If not, the IOP 10 omits the operations described in the remainder of this paragraph; this feature allows various flexibilities such as the ability to transfer previously-generated data to a memory buffer area. If loading is specified, the Sequencer 32 initiates a read operation from the I/O controller 60 as described for the INTERPRET instruction, except that it also tests the Device Data Width parameter for the current channel, signals the Bus Interface 24 to read data of the indicated width, and if the data width is larger than 8 bits, it latches the byte to be stored at the highest memory address into the Character register, latches the other byte(s) into the Byte Store Table entry for the current channel, and sets the presence bit(s) for said other byte(s).

Next the Sequencer 32 tests the instruction word to see whether it specifies that the data should be interpreted. Depending on the embodiment, this may be specified by an additional single-bit subfield in the instruction word, or it may be implicit in a certain special value of the Device Table Number subfield (e.g., the value zero may indicate "no interpretation"). If "interpretation" is not specified, the Sequencer 32 sets the "Branch" and "Write" bits in the Decision Table Word Latch to 0 and 1, respectively, and omits the processing described in the remainder of this paragraph. If interpretation is specified, the Sequencer 32 initiates a read operation from a Decision Table as described for the INTERPRET instruction, and latches the data into the Decision Table Word Latch 39. The Decision Table used in an INPUT (or OUTPUT) instruction includes the Program Counter value and the "Branch" indication as described for INTERPRET, but omits the subfield that is added to the Channel register (CHAN) in an INTERPRET instruction, and adds a single-bit subfield called "Write". For each possible data value that may be read from the I/O controller 60, "Write" indicates whether that value should be written into the memory buffer area.

If the "Write" bit is false, the Sequencer does not write the data to memory, and omits the steps described in the next three paragraphs. If the "Write" bit is true, the Sequencer disposes of the data from the I/O controller 60 differently according to the Device Data Width and Memory Xfer Width parameters for the channel. The process is described below for an embodiment in which the Width parameters can be either 8 or 16 bits; extension of the technique to other data widths (e.g. 32 bits) is obvious to those skilled in the art.

If the Device Data Width and the Memory Xfer Width are both 8 bits, the Sequencer 32 signals the Bus Controller 24 for a memory byte write operation, providing the address from the Memory Address Table (MAT) entry for the current channel, and providing the data from the Character Register (CHAR). Thereafter, it increments said MAT entry by one, and decrements the Memory Count Table (MCT) entry for the current channel by one.

If the Device Data Width and Memory Xfer width are both 16 bits, the Sequencer 32 proceeds similarly to the above case, except that it provides the data to be written from the character register and the Byte Store Table entry for the channel, and it increments the Memory Address Table (MAT) entry by two and decrements the Memory Count Table (MCT) entry by two.

If the Device Data Width is 8 bits and the Memory Xfer Width is 16 bits, the Sequencer 32 tests the following information for the current channel, to decide how to proceed: the least significant bit of the Memory Address Table (MAT) entry, the Memory Count Table (MCT) entry, and the presence bit in the Byte Store Table (BST) entry. If the MAT entry for the channel is even and the MCT entry is greater than 1, the Sequencer 32 transfers the byte from the Character register (CHAR) to the channel's BST entry, and sets the BST entry's presence bit. If the memory address is even and the Memory Count value is 1, or if the memory address is odd but the channel's BST presence bit is 0, the Sequencer 32 signals the Bus Interface 24 for a memory byte write, provides the data from the CHAR register, and provides the address from the MAT entry for the channel. If said memory address is odd and the channel's BST presence bit is 1, the Sequencer 32 signals the Bus Interface 24 for a memory word write, provides the lower-addressed byte of the data word from the BST and the higher-addressed byte from CHAR, and presents the address as the MAT entry minus one (that is, with its least significant bit 0). In any case with DDW=8 and MXW=16, the Sequencer 32 then increments the MAT entry by one and decrements the MCT entry by one.

Regardless of the "Write" bit, the Sequencer 32 next tests the value of the "Branch" indication. If "Branch" is true, it places the subfield from the Decision Table word on the Internal Data Bus 26, latches it into the Program Count (PC) Register, and then proceeds to fetch and execute the next instruction from that location.

If "Branch" is false, and either the Memory Count value is zero or the "End" bit from the instruction word is 0, the Sequencer proceeds to fetch and execute the next sequential instruction.

If "Branch" is false and the Memory Count Table (MCT) entry is not zero, and "End"=1, the program for handling the current request from the I/O controller is completed. In this case the Sequencer 32 returns to its idle state of sampling the request lines RQNn-0.

OUTPUT INSTRUCTION

This instruction typically reads data from the channel's current buffer area in external memory (56 or 72), optionally interprets the data as described for the INTERPRET instruction (thus possibly changing the contents of the Program Counter (PC)), and then writes the data to an I/O Controller 60. The instruction includes at least four subfields, first a Device Offset, for selecting a data register within the I/O Controller, second a Decision Table Number as described for the INTERPRET instruction, third an "End" subfield as described for the INPUT instruction, and fourth a single-bit "Read" subfield that indicates whether data should be read from memory.

After fetching an instruction word indicating an OUTPUT instruction, the IOP first tests the "Read" bit to determine whether the Character register (CHAR) should be loaded from memory. If "Read"=0, the IOP 10 omits the operations described in the next 3 paragraphs; this feature allows various flexibilities such as the ability to transfer previously generated data to an I/O controller 60. If "Read"=1, the Sequencer 32 obtains data from memory differently according to the Device Data Width and Memory, Xfer Width parameters for the channel. The process is described below for an embodiment in which each Width parameter can be either 8 or 16 bits; extension of the technique to other data widths (e.g., 32 bits) is obvious to those skilled in the art.

If the Device Data Width and the Memory Data Width are both 8 bits, the Sequencer 32 signals the Bus Interface 24 for a memory byte read operation, providing the address from the Memory Address Table (MAT) entry for the current channel. Thereafter, it increments said MAT entry by one, and decrements the Memory Count Table (MCT) entry for the current channel by one. When the Bus Interface 24 signals that data is available on the Internal Data Bus 26, the Sequencer 32 latches it into the Character register (CHAR).

If the Device Data Width and Memory Data Width are both 16 bits, the Sequencer 32 proceeds similarly to the above case, except that it requests a memory word read operation, increments said Memory Address Table (MAT) entry by two and decrements said Memory Count Table (MCT) entry by two, it latches the lower-addressed byte of the word into the Character register (CHAR), and it latches the higher-addressed byte into the Byte Store Table (BST) entry for the channel.

If the Device Data Width is 8 bits and the Memory Data Width is 16 bits, the Sequencer 32 tests the following information for the current channel, to determine how to proceed: the least significant bit of the Memory Address Table (MAT) entry, the Memory Count Table (MCT) entry, and the presence bit in the Byte Store Table (BST) entry. If the memory address is even and the MCT entry is greater than 1, the Sequencer 32 signals the Bus Interface 24 for a memory word read provides the address from the MAT entry, latches the lower-addressed data byte into the Character (CHAR) register, latches the higher-addressed data byte into the BST entry for the channel, and sets the entry's presence bit in the BST. If the memory address is even and the MCT entry contains 1, or if the memory address is odd but the channel's BST presence bit is 0, the Sequencer 32 signals the Bus Interface 24 for a memory byte read, provides the address from the MAT entry, and latches the data into the CHAR register. If the memory address is odd and the channel's BST presence bit is set, the Sequencer 32 simply transfers the contents of the BST entry for the channel to the CHAR register. In any of these cases with DDW=8 and MXW =16, the Sequencer 32 then increments the Memory Address Table entry by one and decrements the MCT entry by one.

Regardless of the "Read" bit, the Sequencer 32 next tests the instruction word to determine whether data should be interpreted. Depending on the embodiment, this may be specified by another single-bit subfield in the instruction word, or it may be implicit in a certain special value of the Device Table Number subfield (e.g., the value zero may indicate "no interpretation"). If interpretation is not specified, the Sequencer sets the "Branch" and "Write" bits in the Decision Table Word latch 20 to false and true, respectively, and omits the processing described in the remainder of this paragraph. If interpretation is specified, the Sequencer 32 initiates a read operation from a Decision Table as described for the INTERPRET instruction, and latches the data into the Decision Table Word latch 20. The Decision Table word used in an OUTPUT instruction is the same as the INPUT: it includes the Program Counter (PC) value, the "Branch" indication, and the "Write" bit.

If the "Write" bit is 1, the Sequencer 32 tests the instruction word to determine if data should be sent to the I/O controller. This may be indicated by an additional 1-bit subfield in the instruction word, or may be implicit in a special value of the Device Offset subfield (for example, the "all-ones" value may indicate "do not send the data"). If "Write"=0 and/or the instruction word doesn't specify sending, the Sequencer 32 omits the steps in the remainder of this paragraph. Otherwise, it next tests the Device Data Width parameter for the current channel. If the parameter indicates an 8 bit I/O Controller, the Sequencer signals the Bus Interface 24 for an I/O byte write operation, and provides the data from the Character (CHAR) register. For a 16-bit I/O Controller, the Sequencer 32 signals the Bus Interface 24 for an I/O word write operation, and provides the lower-addressed byte of the word from the CHAR register and the higher-addressed byte from the Byte Store Table (BST) entry. In either case, the Sequencer 32 commands the ALU 41 to provide the address as the sum or exclusive OR of the contents of the Device Offset subfield and the Device Address Table entry for the current channel.

Regardless of whether data is sent to the I/O controller, the Sequencer 32 completes the OUTPUT instruction according to the value of the "Branch" and "End" bits and the Memory Count Table (MCT) entry, exactly as described for the INPUT instruction.

SEND TO DEVICE INSTRUCTION

This instruction sends a constant byte value to an I/O Controller 60, e.g., a command to condition the future operation of the Controller and its associated device. It includes two subfields, first a Device Offset as described previously for the INTERPRET instruction, and second the 8-bit value to be sent to the I/O Controller 60.

After fetching an instruction word indicating a SEND TO DEVICE instruction, the IOP 10 signals the Bus Interface 24 for an I/O byte write operation, commands ALU 41 to provide the address as the sum or exclusive OR of the Device Offset subfield and the Device Address Table (DAT) entry for the current channel, and provides the data from the Instruction Decoder/Latch. The Sequencer 32 always proceeds to execute the next sequential instruction after a SEND TO DEVICE instruction.

SEND TO MEMORY INSTRUCTION

This instruction writes a constant byte value to the current memory buffer. This is useful, for example, to substitute a special character code for data received in error on a serial communication link. The instruction includes one subfield, the 8-bit value to be written in memory.

After fetching an instruction word indicating a SEND TO MEMORY instruction, the Sequencer 32 signals the Bus Interface 24 for a memory byte write operation, providing the address from the Memory Address Table (MAT) entry for the current channel, and providing the data from the Instruction Decoder/Latch 22. Thereafter, it increments the MAT entry for the channel by one, and decrements the Memory Count Table (MCT) entry for the channel by one. The Sequencer 32 always proceeds to execute the next sequential instruction after a SEND TO MEMORY instruction.

INTERRUPT INSTRUCTION

This instruction causes an interrupt request to the host MPU 54 on the IRQN line, and is typically used when prior instructions have determined that the current buffer in memory (56 or 72) has been completed, i.e., that all the output data in a buffer has been sent to an I/O Controller 60, or that an input buffer has been filled with data from an I/O controller 60, or that an input buffer is logically terminated because of a status or data value read from an I/O controller 60. It includes two or three subfields: first an interrupt vector value that will be sent to the host MPU 54 when said host responds to the interrupt request, second a single-bit "End" subfield that indicates whether the IOP 10 should proceed onward to execute further instruction(s) after the INTERRUPT instruction, and third an optional "Level" subfield that indicates at which of several priority levels this interrupt should be stored or queued.

After fetching an instruction word indicating an INTERRUPT instruction, the Sequencer 32 proceeds as follows. If the multiple-level feature is included in the embodiment, it first uses the value of the "Level" subfield to select in which of the several queues in internal memory 14 the interrupt information should be stored. In any case, the Sequencer 32 writes the vector value from the instruction word into the (selected) Interrupt Queue (INTTAB) along with the identity of the current channel, i.e., the contents of the Channel register (CHAN). If the IOP's interrupt request signal on lines IRQN is not already asserted, it is asserted.

If the "End" bit is 1, the Sequencer 32 then returns to its idle state, in which it samples the request lines RQNn-0 from the various I/O controllers 60. If End is zero, the Sequencer proceeds on to execute the next sequential instruction.

When the host MPU 54 responds to (acknowledges) the interrupt request, the IOP 10 proceeds as follows. If the multi-level feature is includes, it first selects the highest-priority level for which at least one INTERRUPT instruction has been executed, for which the corresponding acknowledgement has not yet been received. The IOP 10 then reads the interrupt information for the earliest such interrupt instruction (selected) from the Interrupt Queue (INTTAB), and places the vector value on the data pins 28. The IOP 10, via its Bus Interface 24, responds to the host MPU 24 and transfers the channel number read from the Interrupt Queue (INT-TAB) to the Interrupt Channel register (INTCHN), from which it can be subsequently read by host MPU 54.

JUMP IF COUNT ZERO INSTRUCTION

This instruction loads a new value into the Program Counter (PC) if the Memory Count Table (MCT) entry for the current channel is zero. It is typically used after an INPUT, OUTPUT, or SEND TO MEMORY instruction, to determine whether the current memory buffer was completed by that instruction. The instruction includes one subfield, namely the address of the instruction to be performed subsequently if the Memory Count Table (MCT) entry is zero.

After fetching an instruction word indicating a JUMP IF COUNT ZERO instruction, the Sequencer 32 tests the Memory Count Table (MCT) entry for the current channel. If it is zero, the Sequencer 32 places the subfield from the Instruction Latch/Decoder on the internal data bus, and signals the Program Counter (PC) to capture the value. The Sequencer 32 then always proceeds to execute the instruction indicated by the (possibly reloaded) Program Counter (PC). If the Memory Count Table (MCT) entry is not zero, the next sequential instruction after the JUMP IF COUNT ZERO is executed.

JUMP IF COUNT NONZERO INSTRUCTION

This instruction is similar to the preceding one, except that the Program Counter (PC) is reloaded if the Memory Count Table (MCT) entry is NOT zero.

JUMP INSTRUCTION

This instruction is similar to the preceding two, except that the Program Counter (PC) is always reloaded.

LOAD START ADDRESS INSTRUCTION

This instruction loads a new value into the Program Counter Table (PCT) entry for a channel, thereby providing the entry point at which execution can be taken up later. It is useful when status or data interpretation, or the expiration of a memory buffer, dictates that the state of the I/O controller, or its associated device or I/O process, is changing or has changed in a major way so that the IOP 10 should respond differently to future requests.

This instruction contains two subfields, one which indicates the address of the first instruction to be performed in the future. The other subfield indicates whether the instruction address should be loaded into the PCT entry for the starting channel (the one loaded into CHAN based on the RQn-0 lines) or the current channel (as modified by INTERPRET instructions since CHAN was so loaded). The first form changes the address at which execution is started in response to the IRQn-0 lines; the second can be used in conjunction with the "load PC from PCT (CHAN)" feature of the INTERPRET instruction, to maintain separate contexts/states for each channel in a multi-channel I/O controller.

After fetching an instruction word indicating a LOAD START ADDRESS instruction, the Sequencer 32 places the subfield value on the internal data bus 26, and signals internal memory 14 to write this value into the Program Count Table (PCT) entry for the channel indicated by channel register 16 or by Auxiliary Channel Register 17.

AND DATA, OR DATA AND XOR DATA INSTRUCTIONS

These instructions logically combine the contents of the Character register (CHAR) from prior instructions, with a constant byte value in the instruction, and store the result back into the Character (CHAR) register. It is common practice in the design of I/O Controllers, to include command and status registers which consist of a set of independent bits and/or subfields, such that in order to control the I/O Controller it is necessary to read the contents of such a register, change the value of some of the bits or subfield(s) but not others, and then write the result back into said register. These instructions provide the means to deal with such registers in such I/O Controllers.

Each of these instructions contain one subfield, namely said constant value. After fetching an instruction word indicating one of these instructions, the Sequencer 32 routes the subfield value to one of the two input busses 43, 45 of Arithmetic and Logic unit (ALU) 41, routes the contents of the Character register (CHAR) to the other input bus, signals the logical unit as to which logical operation to perform, and then latches the result back into the CHAR register. The Sequencer 32 always proceeds to fetch and execute the next sequential instruction after any of these instructions.

RELOAD INSTRUCTION

This last instruction type provides the means by which the IOP 10 can switch to another buffer in memory (56 or 72) when a current buffer has been completed. The RELOAD instruction includes one subfield, a value (Delta CHAN) to be added to the contents of the Channel register 16 to obtain another channel number that is loaded into Auxiliary Channel Register 17 and designates the "reloading channel"; the channel designated by the Channel register 16 is called the "reloaded channel".

After fetching an instruction word indicating a RELOAD instruction, the Sequencer 32 first routes said subfield value to one of the input buses 43, 45 of Arithmetic and Logic Unit 41, routes the value from the Channel register 16 to the other input bus, and thereafter latches the result into the Auxiliary Channel register 17. Then, for each of two or three consecutive cycles depending on the width of the IOP's data bus, it 1) signals the Bus Interface 24 to perform a memory word write operation, 2) provides the address from the reloading channel's Memory Address Table entry (MAT), 3) increments said Memory Address entry by the number of bytes transferred, and 4) decrements the reloading channel's Memory Count Table (MCT) entry by the number of bytes transferred. For the first (or first two) write operation(s), the Sequencer 32 provides the data to be written as the more-significant and less-significant parts of the Memory Address value for the reloaded channel (in the order appropriate for the host MPU 54 with which the embodiment is principally intended to operate). For the last write operation it provides zero as the data to be written.

At the completion of these write operations, the Sequencer 32 tests the decremented Memory Count value for the reloading channel. If the value is zero, the Sequencer 32 transfers the contents of the Device Address Table (DAT) entry for the reloading channel to the MAT entry for the same channel, and transfers the contents of the PCT entry for the same channel to the MCT entry for the same channel.

Regardless of whether the MCT value causes said transfers, the Sequencer 32 next performs two or three consecutive cycles, depending on the width of the IOP's data bus. In each cycle, it signals the Bus Interface 34 to perform a memory read cycle, providing the address from the Memory Address Table (MAT) entry for the reloading channel, and then incrementing this address by the number of bytes transferred. When the Bus Interface 24 signals that the data is available on the internal data bus 26, the Sequencer 32 captures the data for the first and second transfer into the more-significant and less-significant parts of the Memory Address Table (MAT) entry indicated by the Channel register 16 (in the order appropriate for the host processor with which the embodiment is principally intended to operate). For the last read operation, the Sequencer 32 captures the data into the Memory Count Table (MCT) entry indicated by the Channel register 16.

After the read operations are complete, the Sequencer 32 either uses Arithmetic and Logic Unit 41 to decrease the Memory Address value for the reloading channel back to the address from which the (first part of the) reloaded channel's MAT value was read, or else it transfers the copy made earlier to the reloading channel's MAT entry. These two alternatives are equivalent in that they return the Memory Address for the reloading channel back to the start of the data that was read.

This completes the execution of the RELOAD instruction; the sequencer 32 always performs the next sequential instruction thereafter. Note that exhaustion of the complete ring of memory buffers can be determined by a subsequent JUMP IF COUNT ZERO (or NONZERO) instruction.

Figure 4:
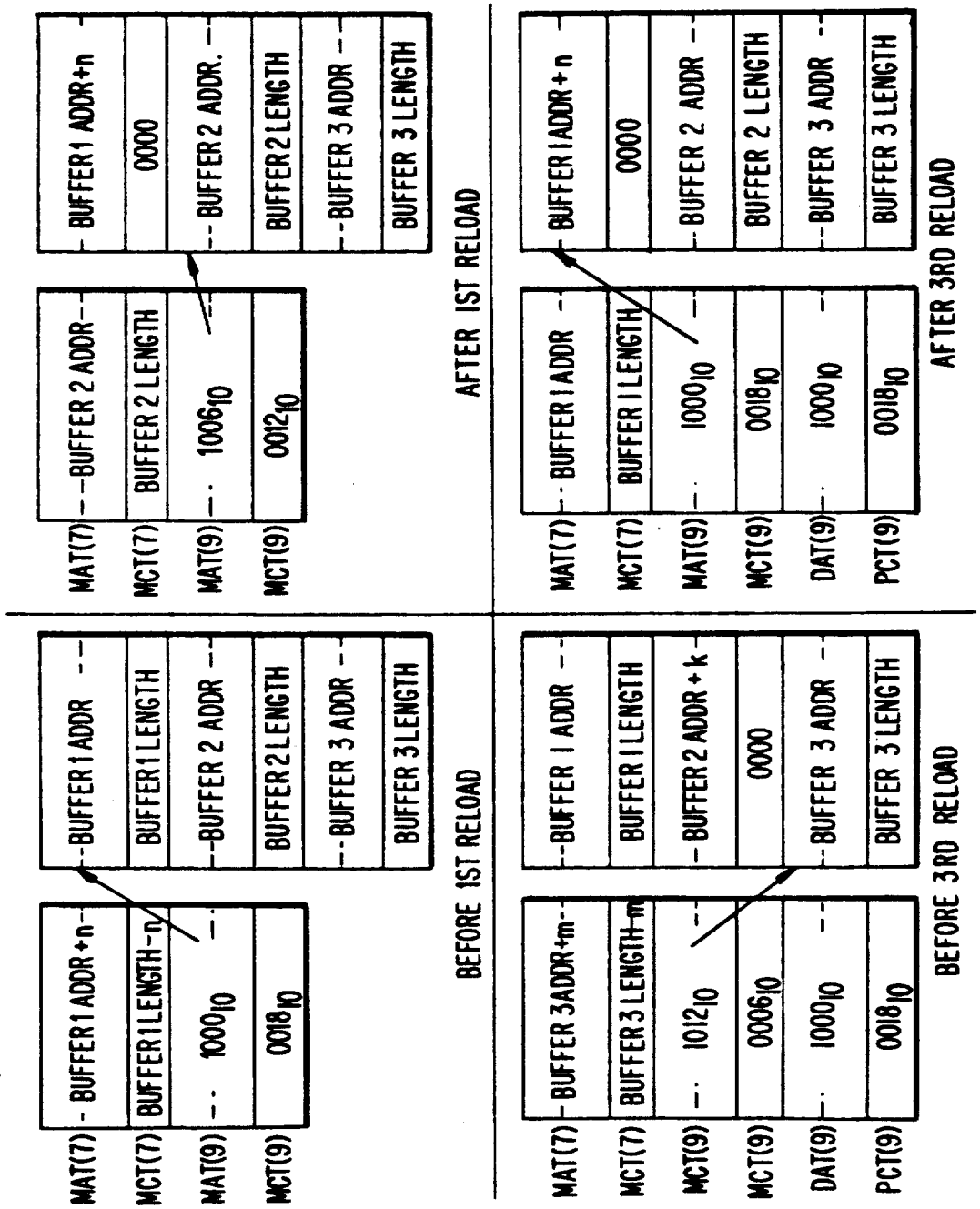
FIG. 4 is a series of partial memory maps showing the effect of multiple executions of a RELOAD instruction.

These operations provide a means for main processor software to set up a "ring" of I/O buffers, which buffers are used by the IOP 10 in a circular, rotating fashion. FIG. 4 shows the effect of two different executions of a RELOAD instruction with CHAN=7 and Delta CHAN=2. Channel 7 has a ring of three I/O buffers and is reloaded via channel 9. The first RELOAD is issued after "n" bytes have been transferred from or to buffer area 1, at which time the host MPU is "current" in that it has provided the addresses and counts of buffers 2 and 3. The other RELOAD is executed some time later; "m" bytes have been transferred from or to buffer 3, and the host MPU is a little "behind" in that it has refreshed the address and count for buffer 1 but has not yet done so for buffer 2. As shown, the Device Address value and the initial Memory Address value for a reloading channel is the address of the start of a series of Address/Count pairs in system memory, one pair for each I/O buffer allocated to the reloaded channel. The Program Counter Table value and the initial MCT value for a reloading channel are programmed to be 6 times the number of I/O buffers.

The writeback of the ending Memory Address enables main processor software to detect the amount of data actually transferred for each buffer. This is particularly significant for input buffers that can be terminated before they are filled, i.e., due to status or data interpretation. Note also that the writing back zero to the count value prevents the IOP 10 from "looping around" the complete ring and re-processing the same buffer before main processor software can process the buffer's input data or fill the buffer with new output data. A RELOAD instruction can be followed by a JUMP IF COUNT ZERO (or NONZERO) instruction to test for this condition.

THE INITIAL REALIZATION

The initial realization of IOP 10, as heretofore described herein, provides for 32 channels and uses 16 bit external and internal data busses and 24 bit memory and I/O addresses. Memory count values are 14 bits, and are conveniently programmed in the same 16 bit word with a single bit Memory Xfer Width parameter and a single bit Device Data Width parameter.

In the initial realization there are five request inputs RQN4-0. A programmable bit in IOP 10's global Control Register (CTRL) indicates whether these inputs are externally coded or directly connected to the request outputs of I/O controllers.

The initial realization does not include any internal memory for instructions or decision tables. Rather, it includes a 13 bit Program Counter Base register, the contents of which are concatenated with the contents of the 10 bit Program Counter to produce a 23-bit word address for instruction fetching. Further, it includes an 11-bit Decision Table register, the contents of which are concatenated with a 4-bit Decision Table Number and the contents of the 8-bit Data character to produce the 23-bit word address from which Decision Table words are fetched.

All instruction words and decision table words are 16 bits wide in this embodiment. For hardware simplicity, the various instructions are differentiated by decoding an op code in the most significant 4 bits of each instruction word, except that the two "Jump if Count..." instructions are differentiated by the next-more-significant bit, and the three "Logic" instructions are differentiated by the two next-more-significant bits.

Further, the Send to Memory instruction uses the same op code as Send to Device but is differentiated by the Device Offset subfield containing all ones.

As implied above, subfields loaded into the Program Counter (PC) or Program Counter Table (PCT) contain 10 bits, and Decision Table Number subfields comprise 4 bits. The value zero in the Decision Table Number subfield of an INPUT or OUTPUT instruction signifies "no interpretation", but decision table 0 can be used meaningfully in an INTERPRET instruction.

Device Offset subfields contain 6 bits. In INTERPRET, INPUT, and OUTPUT instructions, a Device Offset value of all ones (decimal 63) indicates that the I/O Controller should not be read or written.

In Decision Table words for INTERPRET instructions, and in RELOAD instructions, the subfield added to the channel number contains 5 bits.

In addition to the Request mode bit described above, the IOP's global Control (CTRL) register includes a bit enabling or disabling recognition of the request lines, which is conditioned to disable recognition when a device reset signal is applied, so that the IOP does not try to service requests before the main processor has set up the various register and memory locations needed to do so. It also contains a subfield that indicates whether or not the IOP has its own private bus or shares the main processor's bus; this subfield determines how the Bus Interface's arbitration logic operates. For cases in which the IOP and main processor share the same bus, the Control register also includes two fields that throttle and limit the IOP's bus access, which is necessary for applications in which the main processor must be guaranteed some percentage of bus access in order for the overall system to function correctly. These two fields represent, respectively, the maximum length of time that IOP 10 will retain control of the system bus 58, each time, and the minimum length of time IOP 10 will refrain from next requesting control of the system bus 58, after it relinquishes control.

It should be appreciated that numerous modifications, additions and omissions are possible with regard to the details of the preferred and initial realizations of the invention, within the spirit and scope of the invention.

What is claimed is:

1. An I/O processor for a data processing system that includes a main processor, an external memory, a plurality of I/O controllers each controlling one or more I/O channels, and a bus means for interconnecting said main processor, external memory, I/O controller and I/O processor, each I/O controller having means to issue a service request signal indicating one or more types of need for service, said types including a need to transfer data between a channel controlled by said I/O controller and said external memory, each I/O controller having internal status registers indicating the status of the channel(s) controlled by said I/O controller, said external memory having respective addressable buffer areas associated with said channels, said I/O processor comprising:

request means for receiving service request signals from said I/O controllers;

internal memory means for storing channel programs for transferring data between said channels and said external memory, including respective channel program addresses and respective external memory buffer addresses for said channels, said internal memory means being accessible for reading and writing by said main processor;

execution means for performing said channel programs in response to received service request signals, said execution means being configured to execute instructions in an instruction set specific to the task of transferring data to and from I/O controllers, which instruction set includes an instruction invoking an interpretation means, said interpretation means enabling examination by the I/O processor of a status value stored in a status register of an I/O controller or data value from an I/O controller and then determining the course of further operation based on said examination; and means for seeking arbitration of the use of said external bus means by both said main processor and said I/O processor;

wherein said interpretation means utilizes table means, stored in said internal memory means or said external memory, comprised of a plurality of table entries, each of said table entries corresponding to a different possible status value or data value, and includes means for using a status or data value as an index into said table means, and reading therefrom the corresponding table entry.

2. The I/O processor of claim 1 further comprising interrupt means for coupling main processor interrupts from said I/O processor to said main processor for signalling the occurrence of events related to the transferring of data between the external memory and a channel controlled by an I/O controller, including an event of completion of a transfer of a block of data.

3. The I/O processor of claim 2 wherein said internal memory means further comprises means for storing a queue of entries corresponding to main processor interrupts, each of said entries comprising an interrupt vector and a channel number, identifying an occurrence of an event to be signalled.

4. The I/O processor of claim 1 wherein said request means has a plurality of service request inputs for receiving independent service requests from said I/O controllers and further comprising prioritization means for selecting received service requests for response by said execution means according to a predetermined priority order among service requests.

5. The I/O processor of claim 1 wherein said request means has a plurality of service request inputs for receiving service requests from said I/O controllers and means controllable by the main processor for the purpose of signalling the I/O processor whether said plurality of service request inputs present a code corresponding to a channel number requiring service or presents a plurality of independent service requests, each of said independent service requests being on a different one of said service request inputs.

6. The I/O processor of claim 1 wherein said internal memory means further comprises means for storing, for each channel, a count of the number of buffer areas in said external memory corresponding to said channel which remain untransferred during a data transfer to or from such channel.

7. The I/O processor of claim 1 wherein said internal memory means further comprises means for storing for each channel, at least a portion of an address of the I/O controller which controls said channel.

8. The I/O processor of claim 1, wherein said instruction set includes an interpret instruction which invokes said interpretation means for examining a status value from an I/O controller, and wherein the entry read from said table means using said status value as an index includes portions for indicating which next instruction is to be performed by the execution means and whether a current channel number is to be incremented or decremented for use with further instructions.

9. The I/O processor of claim 1 wherein said instruction set includes an INPUT instruction for reading a data value from an I/O controller, said INPUT instruction being configured to selectively invoke said interpretation means, and wherein the entry read from said table means using said data value as an index includes portions for indicating whether or not said data value should be written to external memory and whether channel program execution should continue for a current service request.

10. The I/O processor of claim 1 wherein said instruction set includes an OUTPUT instruction for reading a data value from external memory, said OUTPUT instruction being configured to selectively invoke said interpretation means, and wherein the entry read from said table means using said data value as an index includes portions for indicating whether or not said data value should be written to an I/O controller and whether channel program execution should continue for a current service request.

11. The I/O processor of claim 1 wherein the instructions of said instruction set comprise:
  a. an INTERPRET instruction that reads a status value from an I/O controller and invokes the interpretation means;
  b. An INPUT instruction that performs any combination of three operations: reading data from an I/O controller, invoking the interpretation means, and writing data to external memory;
  c. an OUTPUT instruction that performs any combination of three operations: reading data from external memory, invoking the interpretation means and sending the data read to an I/O controller;
  d. a SEND TO DEVICE instruction that sends a constant value to an I/O controller;
  e. a SEND TO MONEY instruction that writes a constant value to external memory;
  f. JUMP IF COUNT ZERO and JUMP IF COUNT NONZERO instructions that select the next instruction to be executed, as other than a next subsequent instruction address, depending on a condition of whether there are locations remaining in the buffer area in external memory corresponding to a current channel;
  g. a JUMP instruction that unconditionally selects the next instruction to be executed, as other than a next sequential instruction address;
  h. a LOAD START ADDRESS instruction that modifies the address at which execution will begin, the next time a service request signal corresponding to a current channel is received;
  i. AND DATA, OR DATA, and XOR DATA instructions that perform a logic operation between a constant value and a value from previous instructions; and
  j. a RELOAD instruction type that changes the buffer area in external memory which corresponds to a channel.

12. The I/O processor of claim 1 wherein said internal memory means further comprises means for storing for each channel, at least a portion of an address of the I/O controller which controls said channel.

13. An I/O processor for a data processing system that includes a main processor, an external memory, a plurality of I/O controllers each controlling one or more I/O channels, and a bus means for interconnecting said main processor, external memory, I/O controller and I/O processor, each I/O controller having means to issue a service request signal indicating one or more types of need for service, said types including a need to transfer data between a channel controlled by said I/O controller and said external memory, each I/O controller having internal status registers indicating the status of the channel(s) controlled by said I/O controller, said external memory having respective addressable buffer areas associated with said channels, said I/O processor comprising:
  request means for receiving service request signals from said I/O controllers;
  internal memory means for storing channel programs for transferring data between said channels and said external memory, including respective channel program addresses and respective external memory buffer addresses for said channels, said internal memory means being accessible for reading and writing by said main processor;
  execution means for performing said channel programs in response to received service request signals, said execution means being configured to execute instructions in an instruction set specific to the task of transferring data to and from I/O controllers, which instruction set includes an instruction invoking an interpretation means, said interpretation means enabling examination by the I/O processor of a status value stored in a status register of an I/O controller or data value from an I/O controller and then determining the course of further operation based on said examination;
  means for seeking arbitration of the use of said external bus means by both said main processor and said I/O processor; and
  interrupt means for coupling main processor interrupts from said I/O processor to said main processor for signalling the occurrence of events related to the transferring of data between the external memory and a channel controlled by an I/O controller, including an event of completion of a transfer of a block of data;
  wherein said internal memory means further comprises means for storing a queue of entries corresponding to main processor interrupts, each of said entries comprising an interrupt vector and a channel number, identifying an occurrence of an event to be signalled.

14. The I/O processor of claim 13 wherein said interruption means utilizes table means, stored in said internal memory means or said external memory, comprised of a plurality of table entries, each of said table entries corresponding to a different possible status value or data value, and includes means for using a status or data value as an index into said table means, and reading therefrom the corresponding table entry.

15. The I/O processor of claim 14 wherein said instruction set includes an INTERPRET instruction which invokes said interpretation means for examining a status value from an I/O controller, and wherein the entry read from said table means using said status value as an index includes portions for indicating which next instruction is to be performed by the execution means and whether a current channel number is to be incremented or decremented for use with further instructions.

16. The I/O processor of claim 14 wherein said instruction set includes an INPUT instruction for reading a data value from an I/O controller, said INPUT instruction being configured to selectively invoke said interpretation means, and wherein the entry read from said table means using said data value as an index includes portions for indicating whether or not said data value should be written to external memory and whether program execution should continue for a current service request.

17. The I/O processor of claim 14 wherein said instruction set includes an OUTPUT instruction for reading a data value from external memory, said OUTPUT instruction being configured to selectively invoke said interpretation means, and wherein the entry read from said table means using said data value as an index includes portions for indicating whether or not said data value should be written to an I/O controller and whether channel program execution should continue for a current service request.

18. The I/O processor of claim 13 wherein said request means has a plurality of service request inputs for receiving independent service requests from said I/O controllers and further comprising prioritization means for selecting received service requests for response by said execution means according to a predetermined priority order among service requests.

19. The I/O processor of claim 13 wherein said request means has a plurality of service request inputs for receiving service requests from said I/O controllers and means controllable by the main processor for the purpose of signalling the I/O processor whether said plurality of service request inputs present a code corresponding to a channel number requiring service or presents a plurality of independent service requests, each of said independent service requests being on a different one of said service request inputs.

20. The I/O processor of claim 13 wherein said internal memory means further comprises means for storing for each channel, a count of a number of data locations in the buffer area of said external memory corresponding to said channel which remain untransferred.

21. The I/O process of claim 13 wherein the instructions of said instruction set comprise:
 a. an INTERPRET instruction that reads a status value from an I/O controller and invokes the interpretation means;
 b. an INPUT instruction that performs any combination of three operations: reading data from an I/O controller, invoking the interpretation means, and writing data to external memory;
 c. an OUTPUT instruction that performs any combination of three operations: reading data from external memory, invoking the interpretation means and sending the data read to an I/O controller;
 d. a SEND TO DEVICE instruction that sends a constant value to an I/O controller;
 a. a SEND TO MEMORY instruction that writes a constant value to external memory;
 f. JUMP IF COUNT ZERO and JUMP IF COUNT NONZERO instructions that select the next instruction to be executed, as other than a next subsequent instruction address, depending on a condition of whether there are locations remaining in the buffer area in external memory corresponding to a current channel;
 g. a JUMP instruction that unconditionally selects the next instruction to be executed, as other than a next sequential instruction address;
 h. a LOAD START ADDRESS instruction that modifies the address at which execution will begin, the next time a service request signal corresponding to a current channel is received;
 i. AND DATA, OR DATA, and XOR DATA instructions that perform a logic operation between a constant value and a value from previous instructions; and
 j. A RELOAD instruction type that changes the buffer area in external memory which corresponds to a channel.

22. A data processing system comprising:
 a plurality of I/O controllers each controlling one or more I/O channels;
 a main processor;
 an external memory having a buffer area for each channel;
 an I/O processor;
 bus means coupling said main processor, external memory, I/O controllers and I/O processor for data transfer;
 request means coupling said I/O controllers and said I/O processor whereby each I/O controller may issue a service request signal to said I/O processor indicating a need for service, said service comprising transferring data between said I/O processor and said external memory;
 arbitration means coupling said I/O processor and said main processor for said I/O processor to request and be granted mastery of said bus means;
 said I/O processor comprising:
  internal memory means for storing information necessary for transferring data between said channels and said external memory including channel program and external memory buffer addresses for said channels; and
  execution means for performing said channel programs in response to received service request signals, including examining a status value or a data value from an I/O controller, and based on said examining, determining the course of future operation of the I/O processor, said execution means comprising means for performing instructions from an instruction set specific to the task of transferring data between an I/O controller and said external memory, wherein said instruction set includes instructions invoking an interpretation means, said interpretation means enabling examination by the I/O processor of a status value or a data value from an I/O controller or from said external memory, by using said status or data value as an index into a table means stored in said internal memory means to read a word, and using the contents of said word to determine the course of future operation of said I/O processor.

23. The system of claim 22 wherein said request means comprises a plurality of request input lines to said I/O processor, one line from each I/O controller, and wherein said I/O processor includes prioritization means for determining in a prioritized manner an order of response by said execution means to plural request signals on different ones of said request input lines.

24. The system of claim 22 wherein said request means comprises means for presenting to said I/O processor a code indicating an externally selected request from an I/O controller.

25. The system of claim 22 wherein said bus means comprises a system bus interconnecting said main processing unit and part of said external memory; a local bus interconnecting said I/O processor, said I/O controllers, and another part of said external memory, and controllable coupling means between said system and local busses, and where said arbitration means is configured so that the main processor normally has mastery of the system bus but may selectively grant temporary mastery thereof to the I/O processor and that the I/O processor normally has mastery of the local bus but may selectively grant temporary mastery thereof to said main processor.

26. The system of claim 25 wherein the part of said external memory connected to the local bus stores said channel programs, the addresses of said channel programs being stored in said internal memory means.

27. The system of claim 25 wherein said external memory buffer area for said channels is located in the part of external memory connected to the local bus.

28. The system of claim 25 wherein said external memory buffer area for said channels is located in the part of external memory connected to the system bus.

29. The system of claim 25 wherein said controllable coupling means is selectively controlled by either the main processor or the I/O processor.

30. The system of claim 22 wherein said instruction set includes an INTERPRET instruction which invokes said interpretation means in a manner that the I/O processor examines a status value from an I/O controller, the word read form said table means using said data value as an index, comprising a signed value by which a current channel number is incremented or decremented to a new current channel number, said word further comprising portions for indicating a branch address of an instruction sequence and whether said branch address should be loaded into a program counter of the I/O processor.

31. The system of claim 22 wherein said instruction set includes an INPUT instruction which selectively invokes said interpretation means in a manner that said I/O processor reads a data value from an I/O controller, the word read from said table means using said data value as an index comprising portions for indicating whether said data value should be written into the buffer area in external memory for a current channel, a branch address of an instruction sequence, and whether said branch address should be loaded into a program counter of the I/O processor.

32. The system of claim 22 wherein set instruction set includes an OUTPUT instruction which selectively invokes said interpretation means in a manner that the I/O processor reads a data value from the buffer area in external memory for a current channel, the word read from said table means using said data value as an index comprising portions for indicating whether said data value should be sent to the I/O controller which controls said current channel, a branch address of an instruction sequence, and whether said branch address should be loaded into a program counter of the I/O processor.

33. A data processing system comprising:
a plurality of I/O controllers each controlling one or more I/O channels;
a main processor;
an external memory having a buffer area for each channel;
an I/O processor;
bus means coupling said main processor, external memory, I/O controllers and I/O processor for data transfer;
request means coupling said I/O controllers and said I/O processor whereby each I/O controller may issue a service request signal to said I/O processor indicating a need for service, said service comprising transferring data between said I/O processor and said external memory;
arbitration means coupling said I/O processor and said main processor for said I/O processor to request and be granted mastery of said bus means;
said I/O processor comprising:
internal memory means for storing information necessary for transferring data between said channels and said external memory including channel program and external memory buffer addresses for said channels; and
execution means for performing said channel programs in response to received service request signals, including examining a status value or a data value from an I/O controller, and based on said examining, determining the course of future operation of the I/O processor, said execution means comprising means for performing instructions from an instruction set specific to the task of transferring data between an I/O controller and said external memory;
wherein said bus means comprises a system bus interconnecting said main processing unit and part of said external memory; a local bus interconnecting said I/O processor, and I/O controllers, and another part of said external memory, and controllable coupling means between said system and local busses, said controllable coupling means being selectively controlled by either the main processor or the I/O processor, and where said arbitration means is configured so that the main processor normally has mastery of the system bus but may selectively grant temporary mastery thereof to the I/O processor and that the I/O processor normally has mastery of the local bus but may selectively grant temporary mastery thereof to said main processor.

34. The system of claim 33 wherein said instruction set includes instructions invoking an interpretation means, said interpretation means enabling examination by the I/O processor of a status value or a data value from an I/O controller or from said external memory, by using said status or data value as an index into a table means stored in said internal memory means to read a word, and using the contents of said word to determine the course of future operation of said I/O processor.

35. The system of claim 33 wherein said request means comprises a plurality of request input lines to said I/O processor, one line for each I/O controller, and wherein said I/O processor includes prioritization means for determining in a prioritized manner an order of response by said execution means to plural request signals on different ones of said request input lines.

36. The system of claim 33 wherein said request means means for presenting to said I/O processor a code indicating an externally selected request from an I/O controller.

37. The system of claim 33 wherein the part of said external memory connected to the local bus stores said channel programs, the addresses of said channel programs being stored in said internal memory means.

38. The system of claim 33 wherein said external memory buffer area for said channels is located in the part of external memory connected to the local bus.

39. The system of claim 33 wherein said external memory buffer area for said channels is located in the part of external memory connected to the system bus.

40. The system of claim 34 wherein said instruction set includes an INTERPRET instruction which invokes said interpretation means in a manner that the I/O processor examines a status value from an I/O controller, the word read form said table means using said data value as an index, comprising a signed value by which a current channel number is incremented or decremented to a new current channel number, said word further comprising portions for indicating a branch address of an instruction sequence and whether said branch address should be loaded into a program counter of the I/O processor.

41. The system of claim 34 wherein said instruction set includes an INPUT instruction which selectively invokes said interpretation means in a manner that said I/O processor reads a data value from an I/O controller, the word read from said table means using said data value as an index comprising portions for indicating whether said data value should be written into the buffer area in external memory for a current channel, a branch address of an instruction sequence, and whether said branch address should be loaded into a program counter of the I/O processor.

42. The system of claim 34 wherein said instruction set includes an OUTPUT instruction which selectively invokes said interpretation means in a manner that the I/O processor reads a data value from the buffer area in external memory for a current channel, the word read from said table means using said data value as an index comprising portions for indicating whether said data value should be sent to the I/O controller which controls said current channel, a branch address of an instruction sequence, and whether said branch address should be loaded into a program counter of the I/O processor.

* * * * *